(12) United States Patent
Protzmann et al.

(10) Patent No.: US 12,326,178 B2
(45) Date of Patent: Jun. 10, 2025

(54) VIBRATION DAMPER FOR CONNECTING TWO DEVICES

(71) Applicant: Sumitomo Riko Company Limited, Aichi (JP)

(72) Inventors: Sabine Protzmann, Steinau (DE); Martin Gromes, Steinau (DE)

(73) Assignee: Sumitomo Riko Company Limited, Aichi (JP)

( * ) Notice: Subject to any disclaimer, the term of this patent is extended or adjusted under 35 U.S.C. 154(b) by 391 days.

(21) Appl. No.: 17/862,981

(22) Filed: Jul. 12, 2022

(65) Prior Publication Data

US 2023/0028093 A1   Jan. 26, 2023

(30) Foreign Application Priority Data

Jul. 13, 2021   (DE) .......................... 202021103745.8

(51) Int. Cl.
*F16F 1/38*   (2006.01)
*B60K 5/12*   (2006.01)

(52) U.S. Cl.
CPC .......... *F16F 1/3835* (2013.01); *B60K 5/1208* (2013.01); *F16F 2224/025* (2013.01); *F16F 2228/001* (2013.01); *F16F 2230/0005* (2013.01); *F16F 2234/02* (2013.01)

(58) Field of Classification Search
CPC .............. F16F 1/3835; F16F 2224/025; F16F 2228/001; F16F 2230/0005; F16F 2234/02; B60K 5/1208
USPC ............ 267/140.2–140.5, 141, 141.1–141.7, 267/292–294; 248/550, 562, 632–638
See application file for complete search history.

(56) References Cited

U.S. PATENT DOCUMENTS

| | | | | |
|---|---|---|---|---|
| 4,033,533 A * | 7/1977 | Evrard | ................... | F16F 1/3735 267/67 |
| 4,286,777 A * | 9/1981 | Brown | ..................... | F16F 3/093 267/141.1 |
| 5,540,420 A * | 7/1996 | Luzsicza | ................... | F16F 1/38 267/141.1 |
| 5,799,930 A * | 9/1998 | Willett | .................... | F16F 3/093 267/141.5 |
| 7,163,200 B2 * | 1/2007 | Dickson | ................ | F16F 1/3735 267/293 |

(Continued)

FOREIGN PATENT DOCUMENTS

| | | |
|---|---|---|
| DE | 19500975 A1 | 7/1995 |
| DE | 102019113663 A1 | 11/2020 |

(Continued)

OTHER PUBLICATIONS

German Patent Office Search Report with abstracts dated Apr. 14, 2022 for German Patent Application No. 202021103745.8.

*Primary Examiner* — Christopher P Schwartz
(74) *Attorney, Agent, or Firm* — McCarter & English, LLP

(57) ABSTRACT

The invention relates to a vibration damper for connecting two devices to one another, in particular an engine to an environment (100) of the engine, for example a car body, wherein the vibration damper includes a damping section (20) and a fastening section (10), wherein the mounting portion (10) is formed with first and second pipe socket portions (14) having a flange (12), and wherein the damping portion (20) at least partially surrounds the fastening portion (10) at the outer surface thereof.

16 Claims, 2 Drawing Sheets

(56) References Cited

U.S. PATENT DOCUMENTS

| | | | |
|---|---|---|---|
| 8,016,275 B2* | 9/2011 | Ting | F16F 1/376 |
| | | | 267/140 |
| 11,953,049 B2* | 4/2024 | Trippel | F16B 5/0241 |
| 11,976,703 B2* | 5/2024 | Rose | F16F 1/3735 |
| 2020/0355238 A1* | 11/2020 | Dull et al. | F16F 1/3605 |
| 2024/0133445 A1* | 4/2024 | Lang | F16F 1/3814 |

FOREIGN PATENT DOCUMENTS

| | | |
|---|---|---|
| EP | 1491773 A1 | 12/2004 |
| EP | 3499059 A1 | 6/2019 |

\* cited by examiner

VIBRATION DAMPER FOR CONNECTING TWO DEVICES

BACKGROUND

1. Cross-Reference to Related Application(s)

The present application claims priority benefit to a German patent application filed on Jul. 13, 2021, and assigned Serial No. DE 202021103745.8. The content of the foregoing German patent application is incorporated herein by reference.

2. Technical Field

The invention relates to a vibration damper for connecting two devices, in particular an engine to a surrounding of the engine, for example a car body, with a damping section and a fastening section, so that vibrations from the engine are absorbed and taken up by the damping section, while the fastening section is frictionally connected to the car body and the engine via the damping section.

3. Background Art

In the state of the art, there are various approaches to acoustically decouple a device that generates vibrations from another device. In the field of vehicle construction, for example, the aim is to acoustically decouple a vibrating internal combustion engine from a car body in order to prevent the occupants of a vehicle from being adversely affected by vibration noise. For example, EP 3 499 059 A1 describes a vibration damper in which a screw bolt is connected to a vibration-triggering device, this screw bolt being connected via a damping device to another device, such as a body of a vehicle, from which the vibrations are to be kept as far away as possible.

DE 10 2019 113 663 A1 discloses a vibration damping spacer consisting essentially of two parts made of a resilient vibration damping material, which are inserted through a hole in a car body or vehicle frame, said components having flange-like portions which bear against the edges of the hole, while they clamp-like enclose the edge of the hole from both sides through a fastening bolt.

Both proposals according to this state of the art have manufacturing disadvantages as well as stability problems.

Consequently, it is a task of the present invention to provide a vibration damper which, on the one hand, can be easily and faultlessly mounted and, on the other hand, can establish a permanently stable and vibration-absorbing connection between two devices.

SUMMARY

According to the invention, a device according to claim 1 is accordingly formed with respect to its mounting portion in such a way that this comprises a first and a second flanged pipe socket portion, the damping portion at least partially surrounding the mounting portion at the outer surface thereof, so that the damping portion comes to lie between the devices to be connected in the installation position, in particular between the engine and the environment of the engine.

A retaining section which passes axially through the first and second pipe socket sections with a flange is used, and via this one device, for example an internal combustion engine, is connected to the other device, for example a vehicle frame or a vehicle body. The retaining section is, for example, in the form of a screw bolt with a lock nut.

The damping section can preferably be formed with a first and a second damping element which interact in the installation position.

In order to improve and simplify the manufacture and installation of the vibration damper according to the invention, the pipe socket sections with flange can be of the same design. This means that it is not necessary to pay attention to a certain orientation or a selection of certain pipe socket sections during installation.

According to a further advantageous embodiment, the damping elements can be cylindrical and formed with respective partial circumferential wall sections which engage with each other, in particular in the installation position. The partial circumferential wall sections of the two damping elements can be circumferentially extended over equal angular ranges, in particular from 85° to 90° in each case, preferably by 90°. These damping elements can also be of the same design and can be inserted into each other from above and below, whereby they are arranged inside the flanged pipe socket sections in the assembly position in order to fulfil their damping function. Again, there is no need to select from a variety of components during either fabrication or assembly. This improves the assembly speed and reduces the frequency of errors during assembly.

Furthermore, it is advantageous if the damping elements have inner circumferential engagement structures on their partial circumferential wall sections which correspond to outer circumferential engagement geometries on the flanged pipe socket sections, whereby the engagement structures of the damping elements can engage with the engagement geometries of the pipe socket sections in the installed position. During pre-assembly, the engagement structures of the damping elements, after these have been fitted together, preferably form substantially full-circumference, continuous grooves or ridges, for example. These features allow the components of the vibration damper according to the invention to be easily interlocked and pre-fixed for final assembly, because the engagement structures of the damping elements engage in the engagement geometries of the flanged pipe socket sections and thus allow pre-assembly in a simple and effective manner.

Advantageously, the engagement structures of the damping elements are recesses and the engagement geometries of the pipe socket sections with flange are extensions, in particular corresponding extensions. Conversely, the engagement structures of the damping elements can also be extensions that can engage with engagement geometries of the flanged pipe socket sections, which are then designed as recesses. The recesses or extensions can be full circumferential, partial circumferential or even punctual. Preference is given to recesses and extensions that are each formed completely, since in this case it is not necessary to pay attention to a specific positioning of the components of the vibration damper according to the invention during assembly.

Advantageously, the damping sections are provided with a surface structure on their outside, in particular with bulges, lips or the like extending along the cylinder axis. These surface structures, which can preferably be provided over the outer circumference or the partial circumferential outer surfaces of the damping sections, will on the one hand be able to compensate for manufacturing tolerances during assembly within a hole and on the other hand facilitate pre-assembly by means of a clamping effect. These structures can also provide additional vibration damping.

As already mentioned, it is advantageous if the pipe socket sections with flange and the damping elements are each designed as identical parts in order to promote error-free and quick assembly.

Preferably, the pipe end sections with flange are designed in such a way that they abut each other with their flangeless pipe end sections in the installation position. On the other hand, a gap between the pipe end sections without a flange can also be advantageous, for example in order to absorb additional vibrations or in order to be able to accommodate a damping strut element, which also contributes additional vibration damping properties.

Preferably, flange-like structures are formed on one side of the damping elements at their front ends, preferably in the installation eye, which are preferably formed with contact protrusions or warts extending in the direction of the cylinder axis. These contact protrusions can also compensate for assembly tolerances during assembly and contribute additional damping properties.

A further embodiment can be designed in such a way that the pipe socket sections with flange are formed with respective connecting sections on the flangeless side on the pipe end side. These connecting sections can be threads that can be screwed together for the purpose of assembly. In the installed position, the tube socket sections can be screwed to each other via a thread as well as a counter-thread in order to achieve a pre-fixation for inserting a threaded bolt through the opening formed in the cylinder-symmetrical vibration damper according to this aspect of the invention by pre-assembling its components (Chinese utility model).

BRIEF DESCRIPTION OF THE FIGURES

The present invention is described in more detail below with reference to the accompanying figures, as follows.

DETAILED DESCRIPTION OF EMBODIMENT(S) OF THE INVENTION

Figure 1:
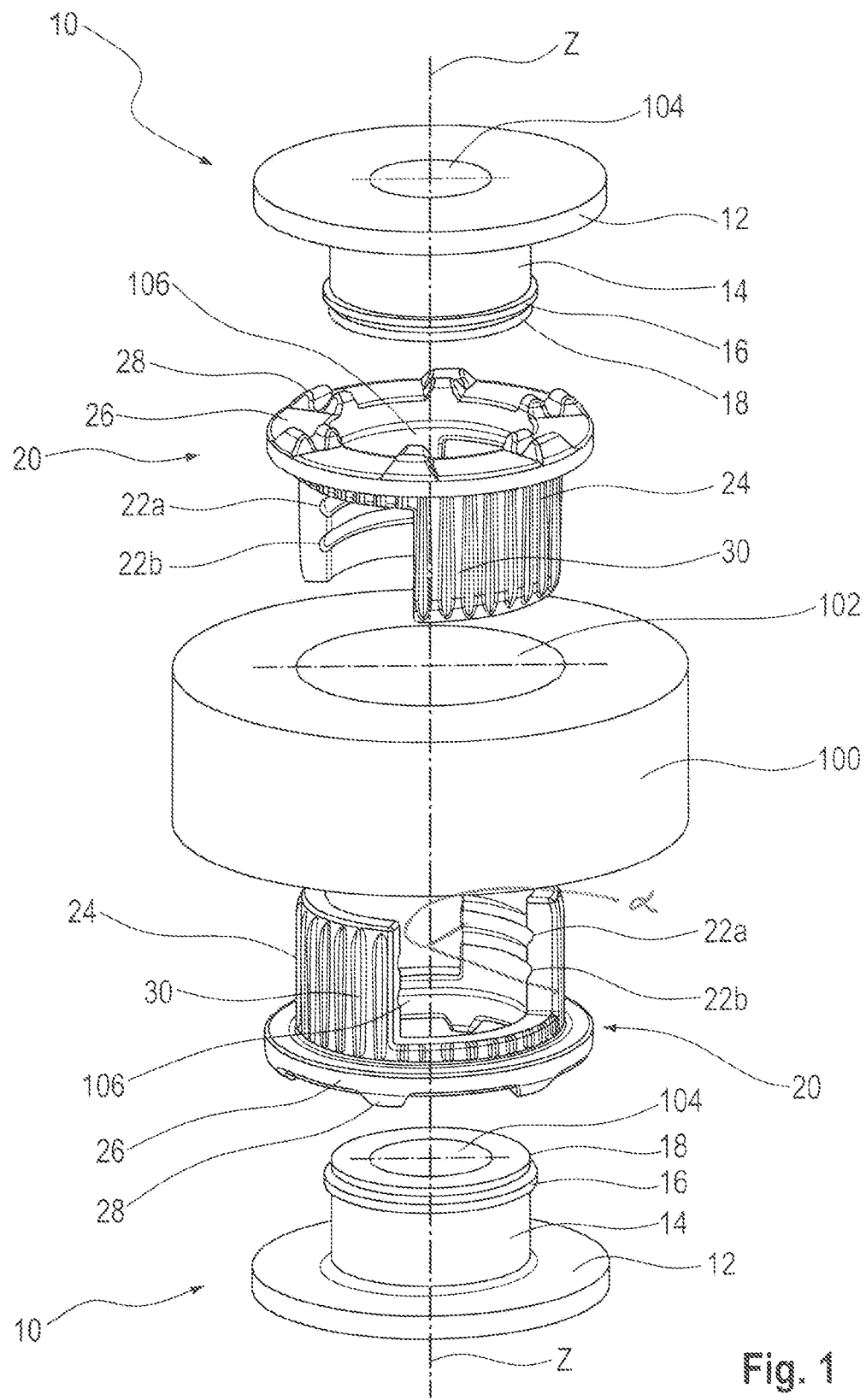
FIG. 1 shows a perspective exploded view of a preferred embodiment.

FIG. 1 shows a preferred embodiment of a vibration damper for connecting two devices together. One device can preferably be an engine, in particular an internal combustion engine, and the other device can be an environment of the engine, such as a vehicle frame, a body or the like.

In the illustration, the vehicle frame or the environment of the engine is schematically represented by the reference sign 100, whereby a hole 102 is provided in which the vibration damper according to the invention is pre-assembled and final assembled.

The illustration shows two pipe sockets 10 with flange 12, each of which is designed to be cylindrically symmetrical with respect to the cylinder axis Z.

Both pipe sockets 10 with flange 12 are preferably designed as identical parts, so that the description of one of the pipe sockets 10 with flange 12 applies simultaneously to the other of the pipe sockets 10 with flange 12.

The same applies to the damping elements 20, which are also preferably designed as identical parts. The differences in their external appearances are only due to their twisted orientation around the cylinder axis Z, which is necessary to be able to plug the two damping elements 20 together.

The exploded view according to FIG. 1 does not immediately reveal that the dimensions of the pipe socket sections 10 in the direction of the cylinder axis Z from their respective flanges 12 to their end 18 of the respective pipe sockets essentially correspond to half the dimension in the direction of the cylinder axis of the assembled damping elements 20. If this dimensional ratio of the pipe sockets 10 to the damping elements 20 is varied, a gap can be established between the pipe sockets 10 with flange 12 in the mounting position, or the pipe sockets can also be mounted without a gap if, for example, a ring-like washer (not shown) is inserted into the gap.

The pipe socket 10 with flange 12 has an engagement geometry at its end facing away from the flange 12, for example a circumferential ridge 16 formed on a pipe section 14 of the pipe socket 10 with flange 12. A pipe end 18 of the pipe socket 14 beyond the circumferential ridge 16 can be brought into contact with an end 18 of the other pipe socket 10 with flange 12 of the same design, which is approached in the installation position from the opposite direction.

Preferably, the pipe sockets 10 with flange 12 are made of a metal or a metal alloy. A hard plastic, for example with a metal powder filling or a mineral powder filling, can also be advantageous for certain applications. Manufacturing technologies can be provided, for example, by injection moulding, casting or the like.

The damping elements 20, which are also preferably designed as identical parts, are preferably made of a permanently elastic material, such as an elastomer. A permanently elastic plastic, such as an ethylene-propylene-diene rubber (EPDM) or a material that is at least comparable in its properties, can be used here.

The advantageously at least approximately cylindrically symmetrical damping elements each have a flange section 26 which adjoins a cylinder section 24. The cylinder section 24 is equipped on the outside with surface structures 30 extending in the direction of the cylinder axis Z, which can compensate for manufacturing tolerances during assembly and can later have additional vibration damping properties in the final assembled state.

Two cylinder sections 24 extend from flange section 26, each cylinder section extending over a partial circumference of approximately 90° and the two cylinder sections 24 lie opposite each other. In this way, the cylinder sections 24 of a damping element 20 formed as an equal part can be brought into engagement with the partial circumferential cylinder sections 24 of the described damping element 20 from opposite along the cylinder axis Z, thus forming a substantially full circumferential cylinder from two damping sections 20. The flange section 26 may include contact projections 28 that extend in the cylinder axis direction of the vibration damper.

Figure 2:
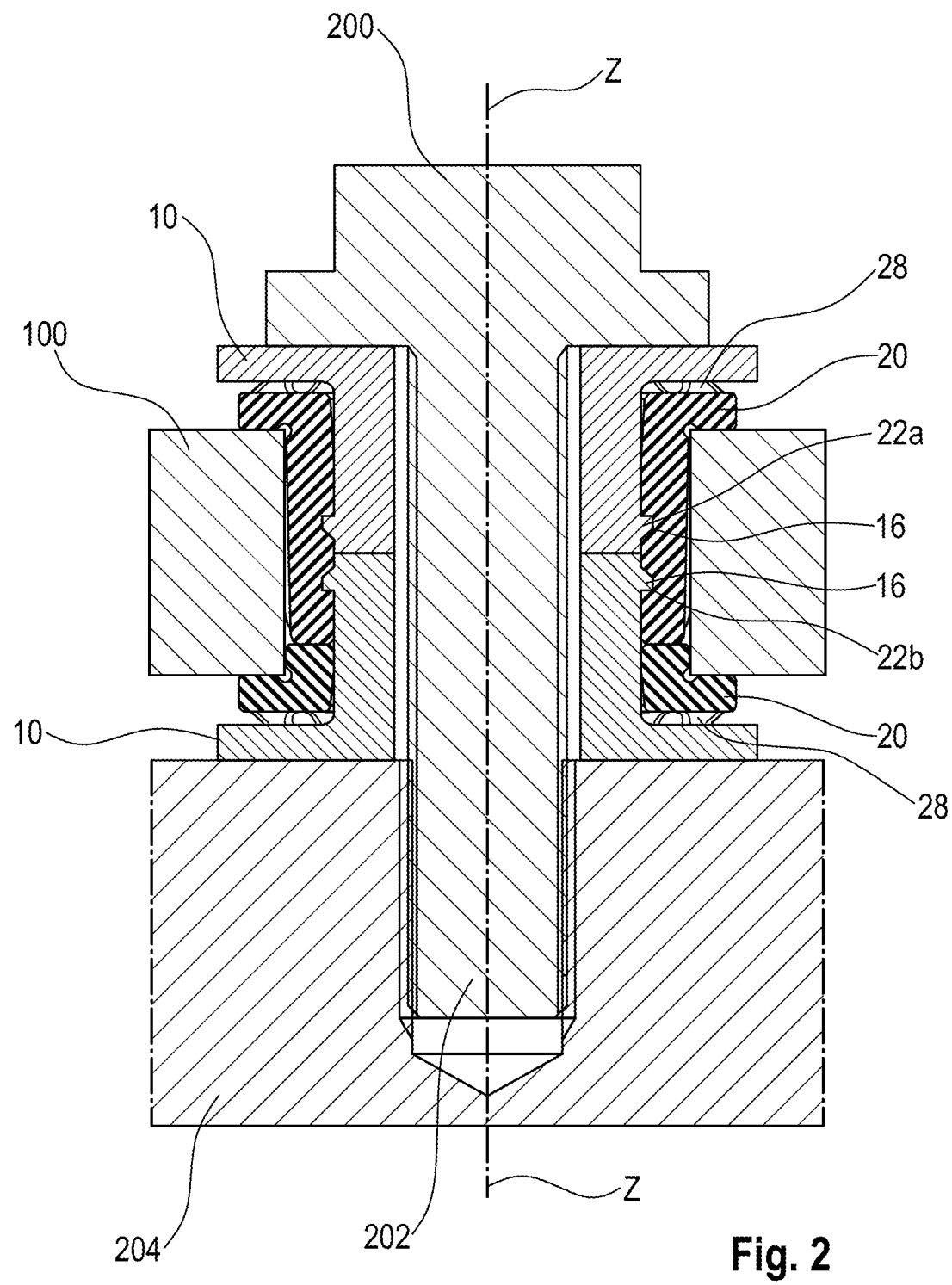
FIG. 2 shows an embodiment in an axial longitudinal section in an assembled installation situation.

Engagement structures 22a, 22b, in this case grooves 22a, 22b, continue fully around the common inner circumference of the two damper elements 20 after they have been assembled as shown in FIG. 2. The engagement geometries, in this case circumferential ridges 16 of the pipe socket 10 with flange 12 can be engaged with the engagement structures 22a, 22b, thereby allowing easy pre-assembly and pre-tensioning of the vibration damper according to this embodiment of the invention within the hole 102 of the vehicle frame 100. The pre-tension is sufficient to hold the vibration damper in its final position until a final assembly bolt, for example, has been inserted through the vibration damper and taken into action.

Since the four components 10, 20 of this embodiment of the vibration damper according to the invention are formed as identical parts, an assembly worker on a production line can easily pre-assemble said components with each other through the opening 102 in the vehicle frame or in the vehicle body, before a screw bolt is inserted through the opening 104 in order to fasten a vibrating device, such as an internal combustion engine, to the vehicle body. In this case, the pipe sockets 10 with flange 12 are inserted from below or above in a free space 106 provided around the inside circumference and engage with their ridges 16 in the grooves 22a, 22b of the damping elements 20 to enable pre-assembly.

FIG. 2 shows an embodiment in which an engine block 204, for example, is mounted to a vehicle frame 100 via a screw bolt 202, 200.

According to FIG. 2, the same components of this embodiment have been designated with the same reference signs as components according to FIG. 1 or according to the first embodiment, so that explanations regarding the first embodiment can also apply to components of the second embodiment according to FIG. 2.

In the installation position shown in FIG. 2, the damping elements 20 are in engagement with each other with their cylinder sections each extending by approximately 90° relative to the full circumference thereof, as shown by the angle α in FIG. 1, so that the shapes of the damping elements 20 complement each other to form a cylindrical shape with the cylinder axis Z as the orientation for the cylinder symmetry. In this installation situation, engagement structures, in this case grooves 22a, 22b, have been fully completed by the interlocking cylinder sections of the damping elements 20. The flanged pipe sockets 10 lie within the assembled damping elements 20 and engage with their engagement geometries, in this case circumferential ridges 16, in the engagement structures 22a, 22b of the damping elements 20, whereby pre-assembly can be accomplished when the installation process has not yet been completed, i.e. when the screw bolt 200, 202 has not yet been inserted through the inner circumference of the assembled damping elements 20 and connected to the section 204, such as a part of an engine block.

In the final assembled state according to FIG. 2, vibrations are absorbed by the assembled damping elements 20 and are not transmitted from the device 204, such as an engine block, to the device 100, such as a vehicle frame, since the damping elements 20 consist of a permanently elastic material. It can be seen that all parts of the vibration damper according to the invention are formed as identical parts, i.e. the two damping sections 22 and the two pipe sockets 10 with flange are each formed identically and can be easily assembled on a production line without any major concentration on the part of an assembling person.

The invention claimed is:

1. A vibration damper for connecting two devices to one another, comprising:
 a) a damping portion formed with first and second damping elements that each define partial circumferential wall portions,
 b) a fastening portion defining an outer surface, wherein the fastening portion is formed with first and second pipe socket portions, wherein each of the first and second pipe socket portions having a flange, wherein the damping portion at least partially surrounds the fastening portion at the outer surface thereof, and wherein the first and second damping elements have inner circumferential engagement structures on the partial circumferential wall portions which correspond to outer circumferential engagement geometries on the first and second pipe socket portions.

2. The vibration damper according to claim 1, wherein the first and second damping elements are cylindrical and are formed with respective partial circumferential wall portions.

3. The vibration damper according to claim 2, wherein the partial circumferential wall portions of the first and second damping elements are extended over equal angular ranges.

4. The vibration damper according to claim 3, wherein the equal angular ranges extend from 85° to 90° in each case.

5. The vibration damper according to claim 4, wherein the equal angular ranges are 90° in each case.

6. The vibration damper according to claim 1, wherein the pipe socket portions include circumferential engagement geometries that connect the pipe socket portions to the first and second damping elements through engagement with the circumferential engagement structures.

7. The vibration damper according to claim 6, wherein the circumferential engagement structures comprise one or more grooves.

8. The vibration damper according to claim 1, wherein the damping portion is provided on its outside with a surface structure.

9. The vibration damper according to claim 8, wherein the surface structure is selected from the group consisting of bulges or lips formed in the direction of the cylinder axis of the vibration damper.

10. The vibration damper according to claim 1, wherein the first and second damping elements have flange-like structures at their ends on the front side in the installation position.

11. The vibration damper according to claim 10, wherein the flange-like structures are formed with contact projections extending in the cylinder axis direction of the vibration damper.

12. The vibration damper according to claim 1, wherein a the first and second flanged pipe socket portions are configured to receive a retaining portion axially therethrough.

13. The vibration damper according to claim 1, wherein the first and second damping elements are cylindrical.

14. The vibration damper according to claim 1, wherein the inner circumferential engagement structures correspond to a recess and the outer circumferential engagement geometries correspond to an extension, or vice versa.

15. The vibration damper according to claim 1, wherein the pipe socket sections with flange and first and second damping elements are each formed as identical parts.

16. The vibration damper according to claim 1, wherein the pipe socket portions abut one another with their pipe end sections in the installed position or leave a gap into which an elastic damping separating element can be inserted.

* * * * *